US008989085B2

(12) United States Patent
Fu

(10) Patent No.: US 8,989,085 B2
(45) Date of Patent: Mar. 24, 2015

(54) DOWNLINK NETWORK SYNCHRONIZATION MECHANISM FOR FEMTOCELL IN CELLULAR OFDM SYSTEMS

(75) Inventor: I-Kang Fu, Taipei (TW)

(73) Assignee: Mediatek Inc. (TW)

( * ) Notice: Subject to any disclaimer, the term of this patent is extended or adjusted under 35 U.S.C. 154(b) by 726 days.

(21) Appl. No.: 12/589,974

(22) Filed: Oct. 30, 2009

(65) Prior Publication Data

US 2010/0110983 A1    May 6, 2010

Related U.S. Application Data

(60) Provisional application No. 61/109,999, filed on Oct. 31, 2008.

(51) Int. Cl.
*H04W 72/00* (2009.01)
*H04J 11/00* (2006.01)
*H04W 56/00* (2009.01)
*H04J 3/06* (2006.01)
*H04L 27/26* (2006.01)

(52) U.S. Cl.
CPC .......... *H04W 56/0015* (2013.01); *H04J 3/0641* (2013.01); *H04J 11/0056* (2013.01); *H04J 11/0069* (2013.01); *H04J 11/0093* (2013.01); *H04L 27/2655* (2013.01)
USPC ........................................................ 370/328

(58) Field of Classification Search
USPC ........................................................ 370/328
See application file for complete search history.

(56) References Cited

U.S. PATENT DOCUMENTS

| 7,436,813 | B2 | 10/2008 | Kim et al. ..................... 370/350 |
| 2002/0012362 | A1 | 1/2002 | Yahata et al. ................. 370/503 |
| 2004/0097249 | A1* | 5/2004 | Manohar ....................... 455/502 |
| 2004/0203853 | A1* | 10/2004 | Sheynblat .................. 455/456.1 |
| 2005/0163262 | A1 | 7/2005 | Gupta ........................... 375/343 |
| 2006/0034250 | A1 | 2/2006 | Kim et al. ..................... 370/350 |
| 2009/0088131 | A1* | 4/2009 | Gholmieh et al. ............ 455/410 |

(Continued)

FOREIGN PATENT DOCUMENTS

| CN | 1214821 A | 4/1999 |
| CN | 1466394 A | 1/2004 |

(Continued)

OTHER PUBLICATIONS

Guang Han et al., "Time Synchronization for Femtocells," IEEE C802.16m-08/1090, Sep. 5, 2008.

(Continued)

*Primary Examiner* — Sulaiman Nooristany
(74) *Attorney, Agent, or Firm* — Imperium Patent Works; Zheng Jin

(57) ABSTRACT

A method of downlink synchronization for a femto base station in a cellular orthogonal frequency division multiplexing (OFDM) system is provided. The femto base station first scans one or more received reference signals transmitted from a plurality of neighboring macro base stations. The femto base station then determines a desired reference signal from the received one or more reference signals based on the scanning result. Finally, the femto base station configures its downlink radio signal transmission time based on the desired reference signal such that the femto base station is synchronized with the plurality of neighboring macro base stations.

21 Claims, 11 Drawing Sheets

(56) References Cited

U.S. PATENT DOCUMENTS

| | | | |
|---|---|---|---|
| 2009/0097452 A1 | 4/2009 | Gogic | 370/331 |
| 2009/0111499 A1* | 4/2009 | Bosch et al. | 455/522 |
| 2009/0196266 A1* | 8/2009 | Wu et al. | 370/338 |
| 2009/0268837 A1* | 10/2009 | Kimura et al. | 375/267 |
| 2010/0027694 A1* | 2/2010 | Touboul et al. | 375/260 |
| 2010/0029295 A1* | 2/2010 | Touboul et al. | 455/456.1 |

FOREIGN PATENT DOCUMENTS

| | | |
|---|---|---|
| CN | 101075848 A | 11/2007 |
| DE | 10032934 A1 | 1/2002 |
| JP | H10190562 | 7/1998 |
| JP | 2006512831 | 4/2006 |
| JP | A2008187552 | 8/2008 |
| WO | WO 2008019568 A1 | 2/2008 |

OTHER PUBLICATIONS

International Search Report and Written Opinion of International Search Authority for PCT/CN2009/074732 dated Feb. 11, 2010 (10 pages).

3GPP TSG-RAN WG 4(Radio) Meeting #48bis, R4-082314, Vodafone Group, Airvana, AT&T, ip.access, picoChip Designs, Qualcomm Europe, Text Proposal for HNB TR25.9xx: Guidance on HNB Measurements, Sep. 29-Oct. 3, 2008, Edinburgh, Scotland (3 pages).

3GPP TR R3.020 V0.9.0(Sep. 2008), Technical Report, 3rd Generation Partnership Project, Technical Specification Group Radio Access Network, Home (e)NodeB, Network aspects(Release 8), paragraph 6.1.4.2.2.

European Patent Office Search Report, for PCT/CN2009074732 (EP09823091), dated May 7, 2012(7 pages).

JPOA, for Japanese application 2011-532487, dated Aug. 7, 2012(5 pages).

Guang Han and Hua Xu, "Time synchronization for Femtocells", IEEE C802.16m-08/1090, Sep. 5, 2008(7 pages).

JPOA, for Japanese application 2011-532487, dated Jan. 15, 2013(5 pages).

SIPO, the Examination Search Report of Chinese application 200980100322.0, dated Jan. 28, 2013 (7 pages).

The Taiwan IPO has prepared the search report for Taiwan patent application 098136856 dated Jun. 5, 2013(7 pages).

* cited by examiner

METHOD OF DOWNLINK SYNCHRONIZATION OF A FEMTO CELL IN CELLULAR OFDMA NETWORK

DOWNLINK NETWORK SYNCHRONIZATION MECHANISM FOR FEMTOCELL IN CELLULAR OFDM SYSTEMS

CROSS REFERENCE TO RELATED APPLICATIONS

This application claims priority under 35 U.S.C. §119 from U.S. Provisional Application No. 61/109,999, entitled "Network Synchronization Mechanism to Support Femtocell in Wireless OFDM Systems," filed on Oct. 31, 2008, the subject matter of which is incorporated herein by reference.

TECHNICAL FIELD

The present invention relates generally to cellular OFDM systems and, more particularly, to downlink network synchronization for Femto base stations in cellular OFDM systems.

BACKGROUND

As bandwidth demand for indoor wireless users continues to grow, cellular operators are trying to explore bandwidth provisioned from indoor, in addition to providing bandwidth from outdoor. Because of the physical nature of radio signals, however, cellular operators have faced difficulties to provide full coverage for indoor users. Cellular repeater is one of the common solutions for current systems, but it may degrade received signal quality and has no intelligence for signal processing. Relay station is another solution developed to resolve this problem, but there is no commercial relay station available yet and it is still under development. Femtocell is yet another solution that is developed to enhance indoor coverage by reusing the licensed spectrum as part of the cellular network infrastructure.

FIG. 1 (Prior Art) illustrates a simplified cellular network 10 that comprises a macro base station BS11 and a femto base station BS12. Cellular network 10 also comprises an outdoor mobile station MS14 and an indoor mobile station MS15. As illustrated in FIG. 1, macro BS11 provides strong signal strength to outdoor MS14, while provides relatively weak signal strength to indoor MS15 because of physical obstruction and/or reflection caused by building 13. On the other hand, femto BS12, an access-point base station (e.g., a small indoor base station), is able to provide strong signal strength and good signal quality to indoor MS15 because femto BS12 is located inside building 13.

Femtocell is anticipated to be an important feature to support extreme high-speed transmission for 4G systems. Both IEEE 802.16m and 3GPP RAN1 & RAN2 are currently developing femtocell technology as part of the standards for WiMAX 2.0 and LTE-Advanced systems. Extreme high-speed transmission will result in very high power consumption and is usually used to support multimedia services, which are more possible be requested by users at indoor environment. By using femto base stations, more radio resources can be saved by using shorter range and lower transmission power. FIG. 2 (Prior Art) illustrates system architecture of a WiMAX femtocell system 20.

Network synchronization of downlink transmission timing in a cellular network is usually performed by Global Positioning System (GPS). GPS is a global navigation satellite system that provides reliable positioning, navigation, and timing service. However, a femto BS may not be able to receive GPS signals and obtain timing reference. FIG. 3 (Prior Art) illustrates a cellular network 30 that comprises a GPS31. Cellular network 30 also comprises macro BS32 and BS33, as well as a femto BS34. As illustrated in FIG. 3, BS32 and BS33 are able to receive GPS signals from GPS31, while BS34 is not able to receive GPS signals and obtain timing reference because it is located inside building 35.

In addition to GPS, backhaul signaling may also help to achieve network synchronization among difference BSs. However, backhaul connection of a femto BS is not reliable for obtaining timing reference. FIG. 4 (Prior Art) illustrates a backhaul connection of a femto BS in a WiMAX femtocell system 40. As illustrated in FIG. 4, Femto BS backhaul is expected to be low-cost xDSL or DOCSIS link. It is not as robust and reliable as dedicated connections used in Macro-/Micro-/Pico-BS. In addition, the round trip delay may be time variant and result in difficulty on precise timing refinement. Thus, downlink network synchronization for femtocell in a cellular orthogonal frequency division multiplexing (OFDM) and/or orthogonal frequency division multiple access (OFDMA) systems remains a challenge.

SUMMARY

A method of downlink synchronization for a femto base station in a cellular orthogonal frequency division multiplexing (OFDM) system is provided. The femto base station first scans one or more received reference signals transmitted from a plurality of neighboring macro base stations. Before the scanning, downlink transmission time among the neighboring macro base stations are already well synchronized. From a mobile station perspective, the arrival time difference between radio signals transmitted by the macro base stations is smaller than the Guard Interval Duration (Tg) of an OFDM symbol.

The femto base station then determines a desired reference signal from the received one or more reference signals based on the scanning result. In one novel aspect, the desired reference signal is a reference signal first received by the femto base station during an observation window. In one embodiment, the observation window length is smaller than a half of a frame length but substantially larger than propagation delay among the plurality of base stations. The actual arrival time of the desired reference signal can be detected by the femto base station using digital signal processing plus a timing detector and a timing abstractor.

Finally, the femto base station configures its downlink radio signal transmission time based on the desired reference signal such that the femto base station is synchronized with the plurality of neighboring macro base stations. In one embodiment, the reference signal is transmitted at the starting boundary of the downlink frame by a neighboring BS. The femto BS sets its downlink starting frame boundary to be the same as the timing when the reference signal is first received by the femto BS. In another embodiment, the reference signal is transmitted at the starting boundary plus an offset of the downlink frame by a neighboring BS. The femto BS sets its downlink starting frame boundary to be the same as the timing when the reference signal is first received by the femto BS plus the same offset.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 illustrates a simplified cellular network that comprises a macro base station and a femto base station.

DETAILED DESCRIPTION

Reference will now be made in detail to some embodiments of the invention, examples of which are illustrated in the accompanying drawings.

Femtocell is developed to enhance indoor coverage by reusing the licensed spectrum as part of cellular network infrastructure. In a femtocell system such as a WiMAX femtocell system, indoor services are mainly served by WiMAX femtocell access point (WFAP). Femtocells typically provide very small cell coverage (e.g. <35 meters) with extreme high-speed transmission for indoor applications such as multimedia services. By reusing the same air interface and operating at the same licensed spectrum as macro cells, network operators benefit from reduced development cost on macro cells for indoor coverage and increased revenue from indoor wireless communication. However, downlink network synchronization among femtocells and macro cells is critical to maintain orthogonality between sub-carriers and prevent inter-carrier interference (ICI) in cellular Orthogonal Frequency Division Multiplexing (OFDM) and/or Orthogonal Frequency Division Multiple Access (OFDMA) networks.

OFDMA has been adopted as the downlink transmission scheme for candidate 4G technologies. OFDMA has been considered for both WiMAX 2.0 and LTE-Advanced downlink transmission. Inter-carrier interference (ICI), however, is a special and significant problem in OFDM networks, which is caused mainly by frequency offset and time variation. To prevent ICI, OFDM network requires synchronized transmission by each base station to maintain orthogonality between subcarriers. Thus, OFDM symbol timing transmitted by each base station should be well aligned. In general, the difference among the arrival times of a radio signal from different base stations shall be smaller than the guard interval of an OFDM symbol to prevent undesired ICI.

Figure 1:
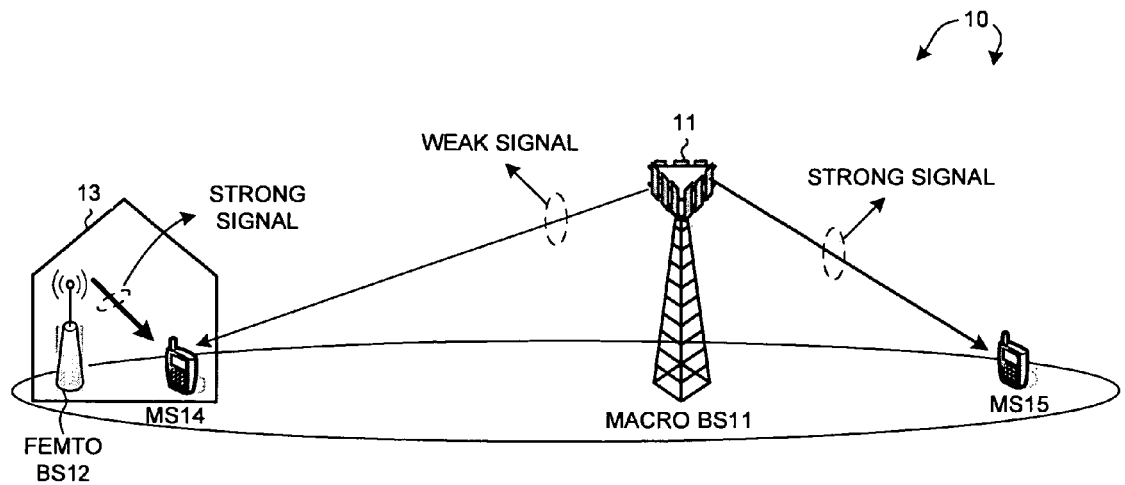
FIG. 1 (Prior Art)
Figure 2:
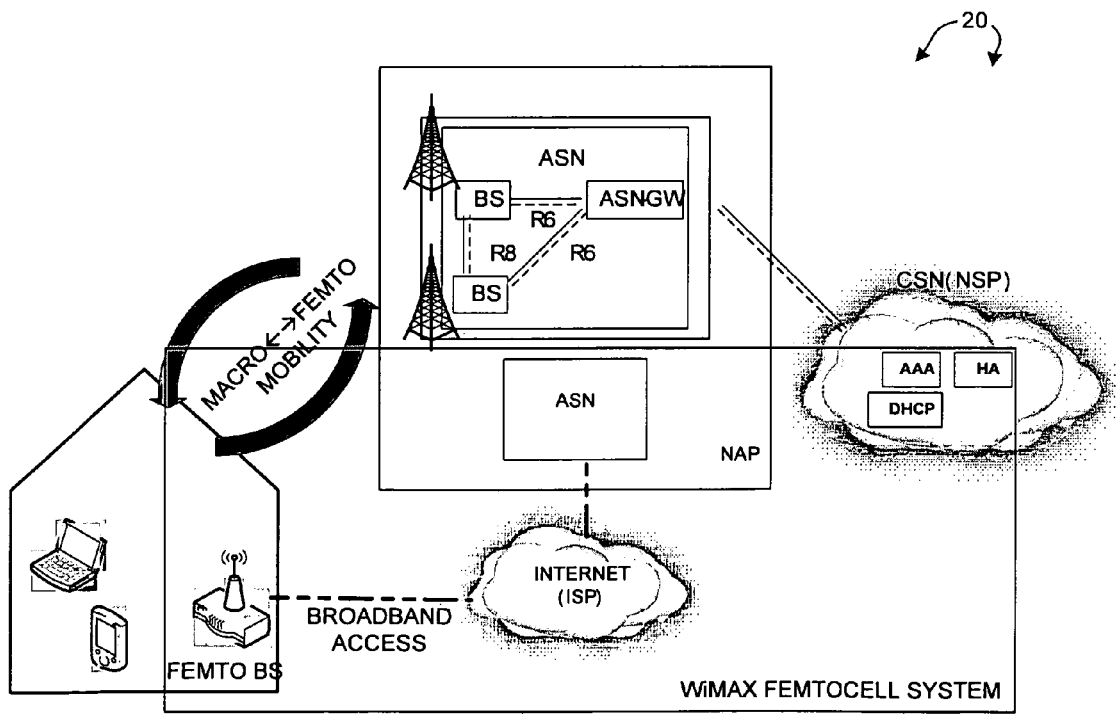
FIG. 2 (Prior Art) illustrates system architecture of a WiMAX femtocell system.
Figure 3:
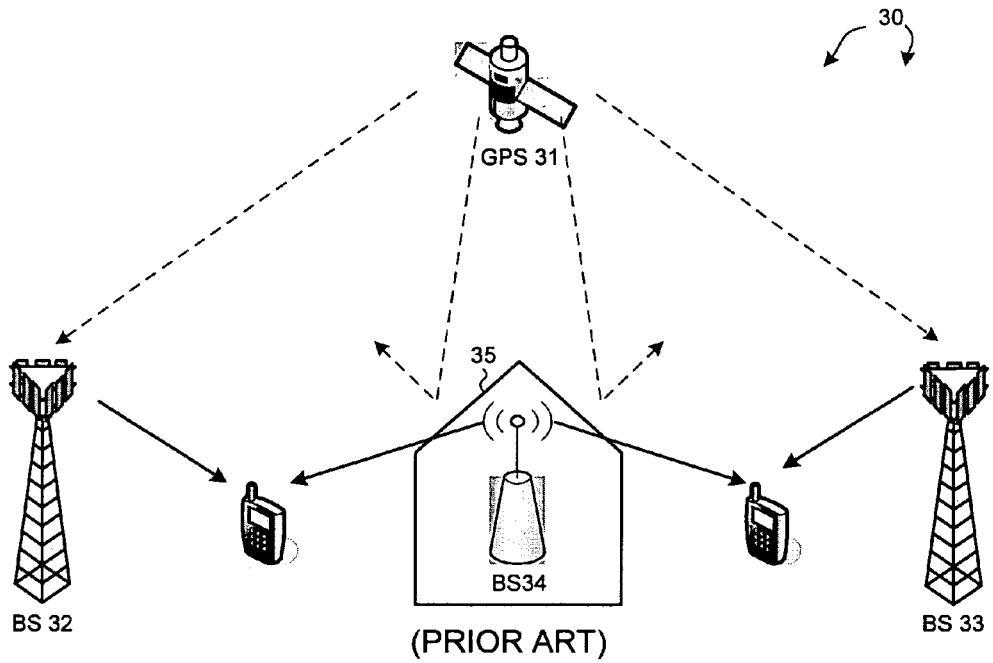
FIG. 3 (Prior Art) illustrates a cellular network that comprises a global positioning system.
Figure 4:
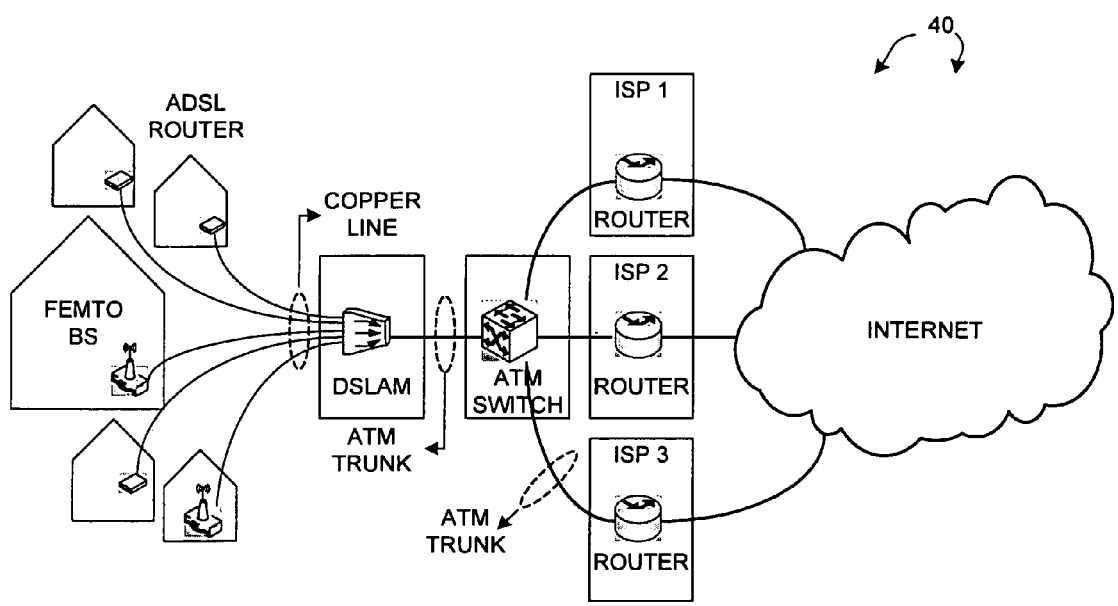
FIG. 4 (Prior Art) illustrates a backhaul connection of a femto BS in a WiMAX femtocell system.
Figure 5:
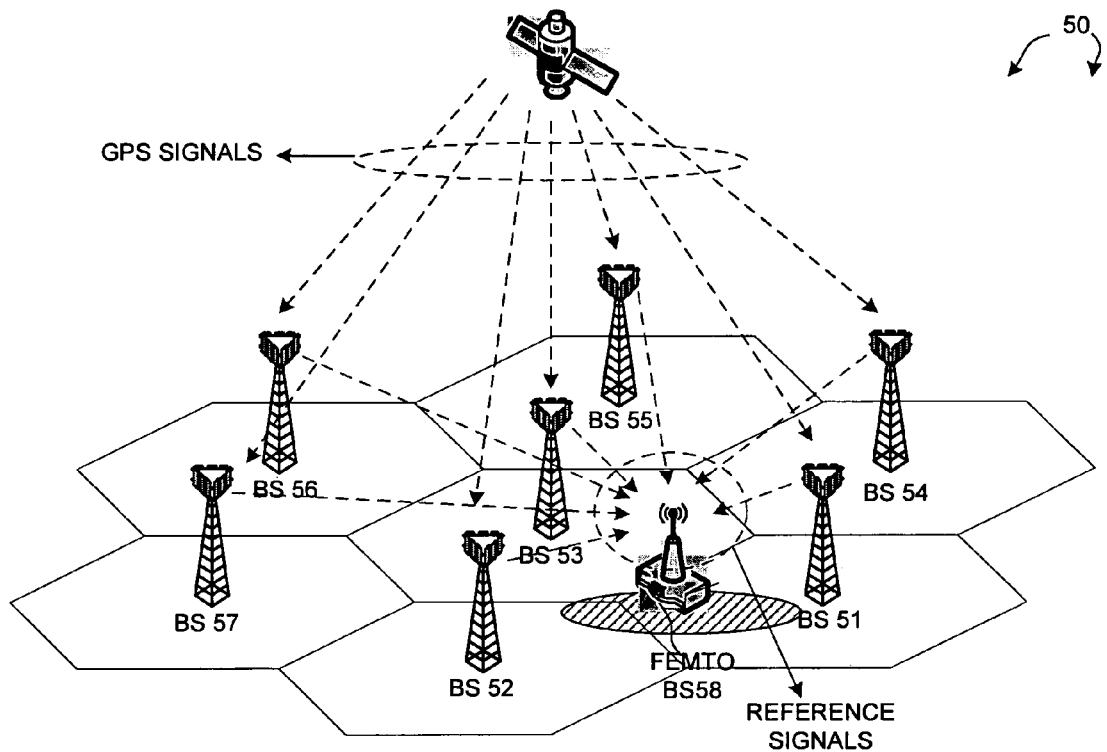
FIG. 5 illustrates a cellular OFDM network 50 with a femto base station in accordance with one novel aspect.

FIG. 5 illustrates a cellular OFDM network 50 with a femto base station in accordance with one novel aspect. Cellular OFDM network 50 comprises a plurality of macro base stations BS51-BS57, a femto base station BS58, and a global positioning system GPS59. Macro base stations BS51-BS57 receive GPS signals from GPS59 and thereby obtain reliable and precise timing reference. As a result, downlink transmission time for BS51-BS57 is well synchronized. From a mobile station perspective, this means that the arrival time difference between radio signals transmitted by BS51-BS57 is smaller than the Guard Interval Duration (Tg) of an OFDM symbol. On the other hand, femto BS58 is not able to receive GPS signals to obtain timing reference. In one novel aspect, femto BS58 receives and scans a plurality of reference signals transmitted from the plurality of macro base stations BS51-BS57, and determines a desired reference signal. Based on the desired reference signal, BS58 is then able to obtain timing reference such that downlink transmission time for femto BS58 and other macro base stations BS51-BS57 is also well synchronized.

Figure 6:
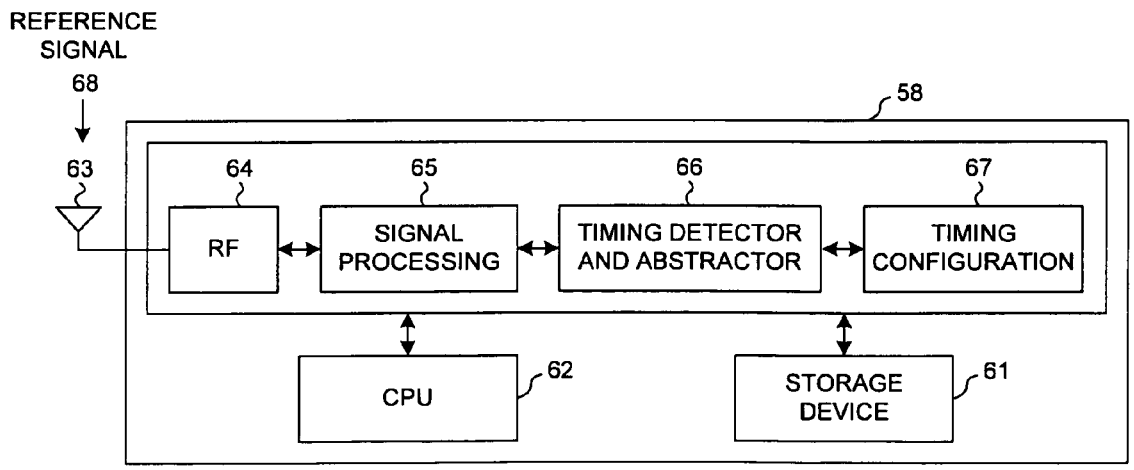
FIG. 6 is a simplified block diagram of a femto base station in accordance with one novel aspect.

FIG. 6 is a simplified block diagram of femto base station BS58 in cellular OFDM network 50 in accordance with one novel aspect. BS58 comprises a storage device 61, a CPU 62, a radio frequency (RF) module 64 coupled with an antenna 63, a signal processing module 65, a timing detector and abstractor 66, and a timing configuration module 67. In the embodiment of FIG. 6, RF module 64 receives a reference signal 68 (analog signal) via antenna 63. Signal processing module 65 converts the analog signal into a digital signal and outputs corresponding sequence code of reference signal 68. Timing detector and abstractor 66 detects the arrival time of reference signal 68 based on the sequence code and then determines a desired timing reference based on the detected arrival time of reference signal 68. Based on the desired timing reference, timing configuration module 67 configures downlink transmission time for femto BS58 to achieve network synchronization.

Figure 7:
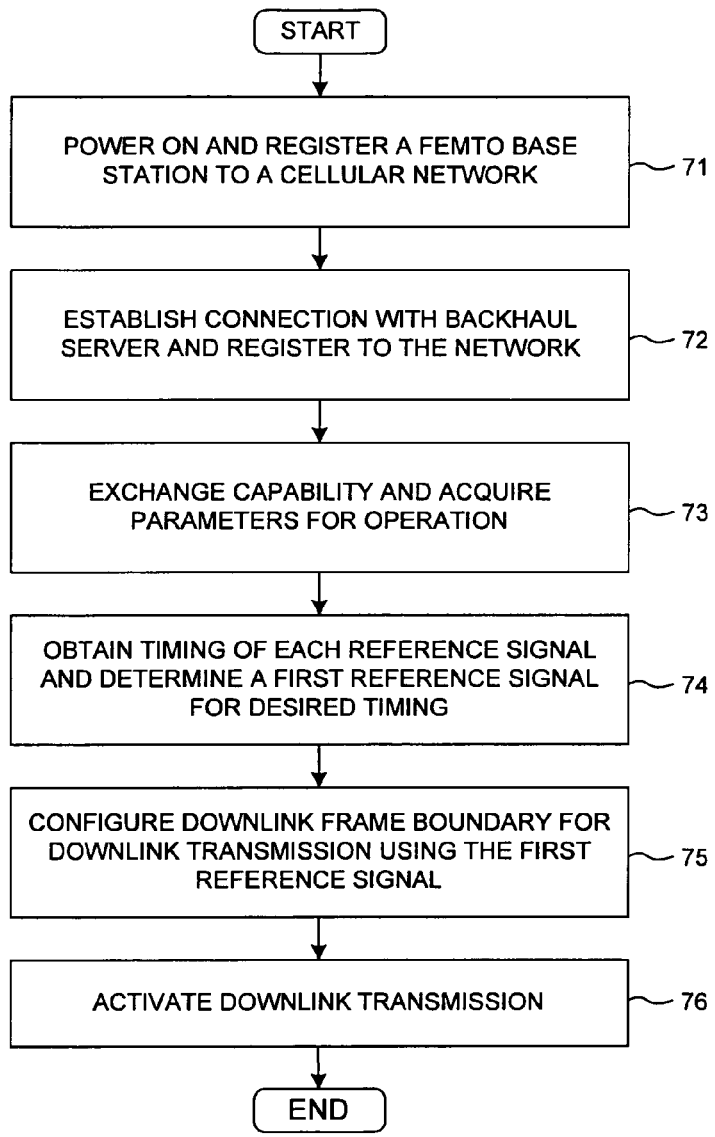
FIG. 7 is a flow chart of a method of activating a femto base station in a cellular OFDM network.

FIG. 7 is a flow chart of a method of activating a femto base station in a cellular OFDM network. In step 71, the femto BS first communicates with its backhaul server and registers to the cellular network after being powered on. The femto BS cannot transmit any radio signal before authorized by the backhaul server. In step 72, the femto BS communicates with the backhaul server to exchange its service capability such as supportable channel bandwidth, protocol version, power class, and support of multi-carrier. In addition, the backhaul server may inform a set of parameters for femtocell operation such as center frequency and bandwidth of the assigned frequency channel(s), transmit power, permutation scheme, and supportable throughput. In step 73, the femto BS scans a plurality of reference signals over the assigned frequency channel. The plurality of reference signals are transmitted from a plurality of neighboring macro base stations. Based on the scanning result, the femto BS detects the arrival time of each of the plurality of reference signals and thereby determines a desired reference signal (step 74). Finally, the femto BS configures its downlink frame boundary based on the timing of the desired reference signal such that downlink network synchronization is achieved among the femto BS and other neighboring macro BSs (step 75). After proper timing configuration, the femto BS is ready to activate downlink transmission (step 76).

A challenging problem in activating a femtocell in a cellular OFDM network is how to achieve downlink network synchronization. There are several issues to be considered in addressing this problem. First, the scope of downlink network synchronization needs to be identified. That is, the femtocell needs to determine which macro base stations to synchronize to in the OFDM network. Second, a desired reference signal needs to be determined from a plurality of reference signals transmitted from a plurality of macro base stations in the OFDM network. By configuring downlink transmission time based on the desired reference signal, network synchronization among the femtocell and other macro base stations can be achieved. Third, the actual arrival time of the desired reference signal needs to be detected. The femtocell can use the exact arrival time of the desired reference signal for its downlink transmission to achieve network synchronization. Each issue is now described below with more detail.

Figure 8:
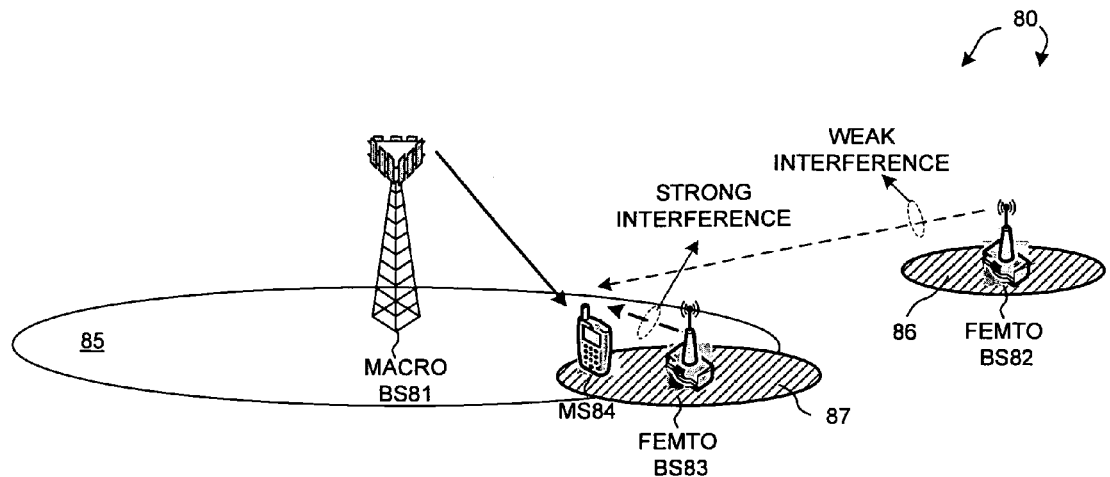
FIG. 8 illustrates a cellular OFDM network with both an isolated femtocell and an overlapped femtocell.

FIG. 8 illustrates a cellular OFDM network 80 with both an isolated femtocell and an overlapped femtocell. Cellular OFDM network 80 comprises a macro base station BS81, a first femto base station BS82, a second femto base station BS83, and a mobile station MS84. Macro BS81 provides signal coverage for cell 85 and is the serving base station for MS84, femto BS82 provides signal coverage for cell 86, and femto BS83 provides signal coverage for cell 87. The cell coverage of a base station is the longest distance within which a mobile station can establish connection. As illustrated in FIG. 8, cell 86 is isolated from cell 85, while cell 87 is overlapped with cell 85. For example, since MS84 is located outside the cell boundary of cell 86, it receives relatively weak interference from femto BS82. On the other hand, since MS84 is located inside the cell boundary of cell 87, it receives relatively strong interference from femto BS83. As a result, the interference problem of a mobile station served by a macro cell caused by a femtocell will be significant only when the femtocell coverage is overlapped with the macro cell coverage, and interference due to unsynchronized transmission can be ignored if the femtocell is an isolated cell. Therefore, in a cellular OFDM network, a femtocell needs to synchronize to only nearby macro cells with overlapping cell coverage. That is, the femtocell needs to scan only reference signals transmitted from overlapping macro cells.

Figure 9:
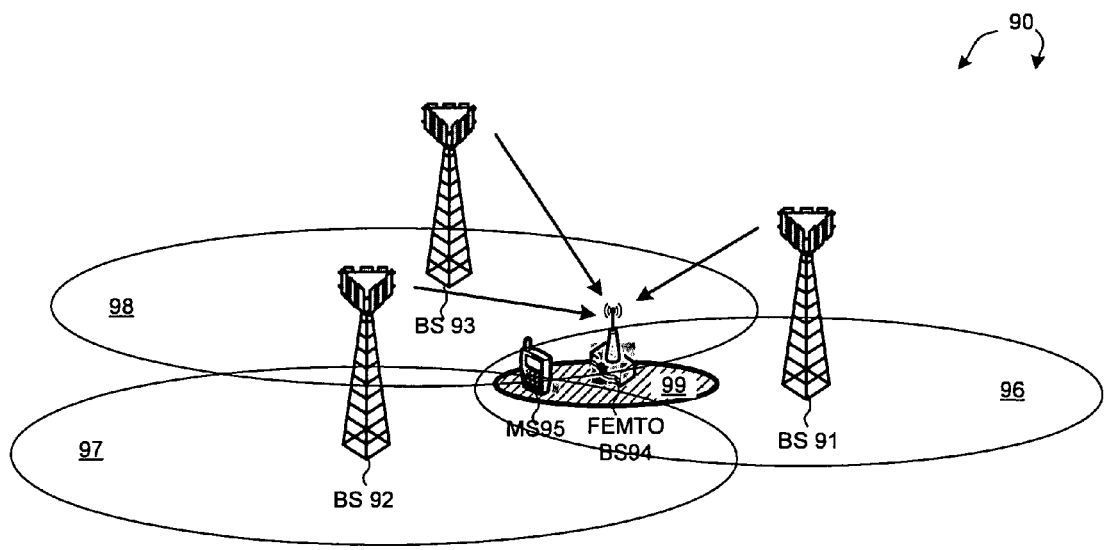
FIG. 9 illustrates a cellular OFDM network with a femtocell overlapping with three macro cells.

After determining the scope of downlink network synchronization, the femtocell needs to determine a desired reference signal from one or more reference signals transmitted by the nearby macro base stations. FIG. 9 illustrates a cellular OFDM network 90 with a femtocell overlapping with three macro cells. Cellular OFDM network 90 comprises a first macro base station BS91 providing cell coverage for cell 96, a second macro base station BS92 providing cell coverage for cell 97, a third macro base station BS93 providing cell coverage for cell 98, and a femto base station BS94 providing cell coverage for cell 99. In the example of FIG. 9, cell 99 overlaps with all three macro cells 96-97, and interference due to unsynchronized transmission between femto BS94 and other macro BS91-93 cannot be ignored. In order to synchronize with all three macro BS91-BS93, femto BS94 scans multiple reference signals transmitted by all three macro BS91-BS93 and then determines which reference signal is a desired reference signal to be used such that downlink synchronization can be achieved between femto BS94 and all three macro BS91-BS93.

Figure 10:
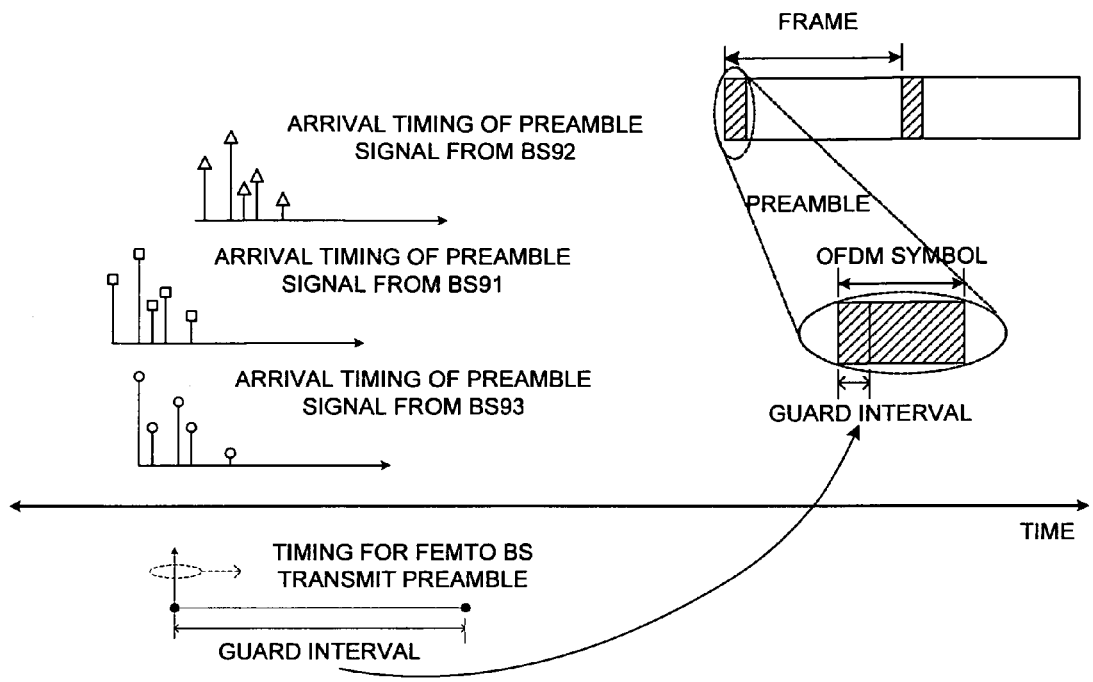
FIG. 10 illustrates multiple reference signals received by a femtocell in a cellular OFDM network.

FIG. 10 illustrates multiple reference signals received by femto BS94 in cellular OFDM network 90. Because macro BS91-BS93 are overlapping macro cells with femto BS94, femto BS94 scans the reference signals (e.g., either preambles or synchronization signals) transmitted by BS91-93. A preamble is a predefined sequence that is modulated over sub-carriers in frequency domain and transmitted as the first OFDM symbol in time domain. In the example of FIG. 10, the arrival times of each preamble signal transmitted from BS91-93 are different, caused by both multipath effect and propagation delay. Among the different arrival times, inter-BS arrival time difference is caused by propagation delay, while intra-BS arrival time difference is caused by multipath effect. Femto BS94 needs to determine which reference signal should be used as the desired reference signal for its downlink transmission to achieve downlink network synchronization. In one novel aspect, femto BS94 always selects a reference signal with the earliest arrival time as the desired reference signal, regardless of which macro BS transmits (normally a macro BS that is closest to the femto BS) the reference signal. Mathematical analysis of selecting the desired reference signal is now described below with more details.

Figure 11:
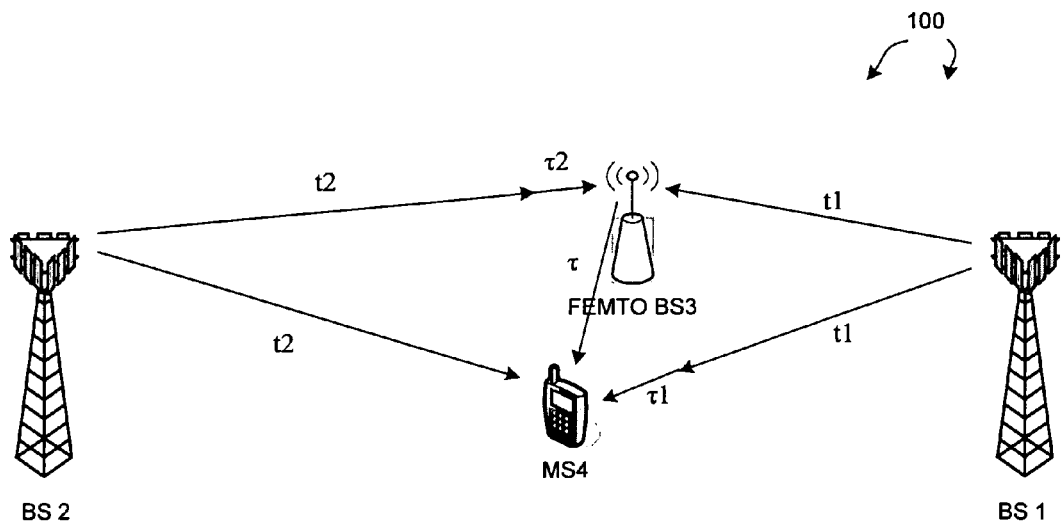
FIG. 11 is a generalized network topology of a cellular OFDM network that illustrates a novel network synchronization approach.

FIG. 11 is a generalized network topology of a cellular OFDM network 100 that illustrates the novel network synchronization approach. In cellular OFDM network 100, BS1 is a macro base station that has the shortest propagation delay when transmitting signals to a femto BS3. BS2 is an arbitrary located macro base station with propagation delay longer than BS1 when transmitting signals to the femto BS3. The time for BS1 to transmit a reference signal to femto BS3 is t1, and the time for BS2 to transmit a reference signal to a mobile station MS4 is t2. The distance between MS4 and femto BS3 is assumed to be less than 150 m, where the femtocell coverage is generally less than 35 m. Other time variables $\tau, \tau1$, and $\tau2$ are depicted in FIG. 11, where $|\tau|>=|\tau1|$ and $|\tau|>=|\tau2|$. Because macro base stations BS1 and BS2 are already synchronized through (e.g. by GPS or by backhaul network), another important assumption is that $T_{DIFF}(BS1, BS2)=|t1+\tau1-t2|<=T_{SYNC}$, where $T_{DIFF}(A, B)$ is the arrival time difference between the signal transmitted by A and B from MS4 perspective, and where $T_{SYNC}$ is the maximum OFDM symbol arrival time difference between two difference base stations to satisfy network synchronization condition. Based on the definition of network synchronization, $T_{SYNC}$ is always smaller than the Guard Interval Duration $T_G$ (e.g. lips for IEEE 802.16m system or 8 μs in 3GPP LTE system), but can be assumed to be larger than 1 μs (e.g., 3 μs in 3GPP LTE system). It is observed that if femto BS3 set its transmission time to be t1 (e.g., the same time as femto BS3 receives the reference signal from the closest macro BS1), then downlink network synchronization conditions can be met. That is, if femto BS3 is synchronized with a closest macro BS1, then femto BS3 is also synchronized with any arbitrary located macro BS2 (e.g., $T_{DIFF}(BS1, BS3)<=T_{SYNC}$ and $T_{TIFF}(BS2, BS3)<=T_{SYNC}$).

Figure 12:
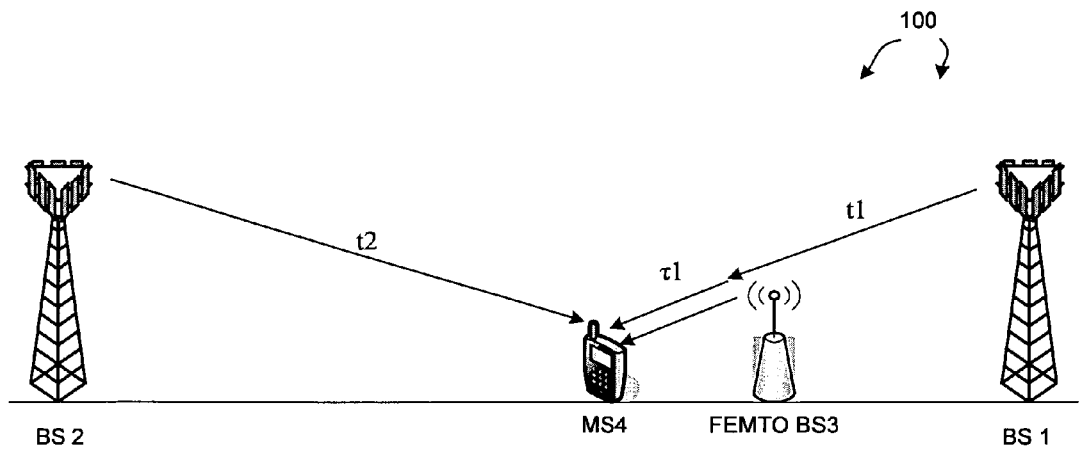
FIG. 12 is a special network topology of a cellular OFDM network that illustrates a novel network synchronization approach.

FIG. 12 is a special network topology of cellular OFDM network 100 that illustrates the above observed network synchronization approach. In the example of FIG. 12, Macro BS1 and BS2, femto BS3, and MS4 are all physically located on the same line. Suppose femto BS3 sets its downlink transmission time to be t1. As a result, $T_{DIFF}(BS1, BS3)=|(t1+\tau1)-(t1+\tau1)|=0$, and $T_{DIFF}(BS2, BS3)=|t2-(t1+\tau1)|=T_{DIFF}(BS2, BS1)<=T_{SYNC}$. Therefore, femto BS3 is synchronized to both macro BS1 and BS2 if it is synchronized to BS1.

Now referring back to the generalized network topology of network 100 in FIG. 11, where femto BS3 also sets its downlink transmission time to be t1. It can be shown that network synchronization conditions $T_{DIFF}(BS1, BS3)<=T_{SYNC}$ and $T_{DIFF}(BS2, BS3)<=T_{SYNC}$ are satisfied if femto BS3 is synced to macro BS1. First, it can be shown that $T_{DIFF}(BS1, BS3)=|(t1+\tau)-(t1+\tau1)|=|\tau-\tau1|<=2\tau$ (because $\tau>=\tau1)=2*$ (Femtocell coverage/propagation speed)$<=2\times150/(3\times10^8)$ $=10^{-6}$ sec=1 $\mu s<=T_{SYNC}$. Thus, network synchronization condition between macro BS1 and femto BS3 is satisfied.

Second, it can be shown that $T_{DIFF}(BS2, BS3)=|(t1+\tau)-t2|$. This equation can be further expanded under two different scenarios. In a first scenario, if $(t1+\tau)>=t2$, then $T_{DIFF}(BS2, BS3)=t1+\tau-t2<=(t2+\tau2)+\tau-t2$ (because $0<t1<=t2+\tau2)=\tau+\tau2<=2\tau$ (because $\tau>=\tau2)=2*$(Femtocell coverage/propagation speed)$<=2\times150/(3\times10^8)=10^{-6}$ sec=1 $\mu s<=T_{SYNC}$. In a second scenario, if $(t1+\tau)<t2$, then $T_{DIFF}(BS2, BS3)=t2-t1-\tau=(t2-t1-\tau1)+(\tau1-\tau)=T_{DIFF}(BS1, BS2)+(\tau1-\tau)<=T_{SYNC}$ $(\tau1-\tau)<=T_{SYNC}$ (because $T_{DIFF}(BS1, BS2)<=T_{SYNC}$, and $\tau>=\tau1$). Thus, network synchronization condition between macro BS2 and femto BS3 is also satisfied under both scenarios. Therefore, the network synchronization conditions are satisfied if femto BS3 is synchronized with the reference signal transmitted from its closest macro BS1.

Having determined the scope of downlink network synchronization and also determined the first received reference signal transmitted from its closest macro base station as the desired reference signal, the femtocell still needs to be able to detect the actual arrival time of the desired reference signal and then configure its downlink transmission time based on the arrival time of the desired reference signal.

Figure 13:
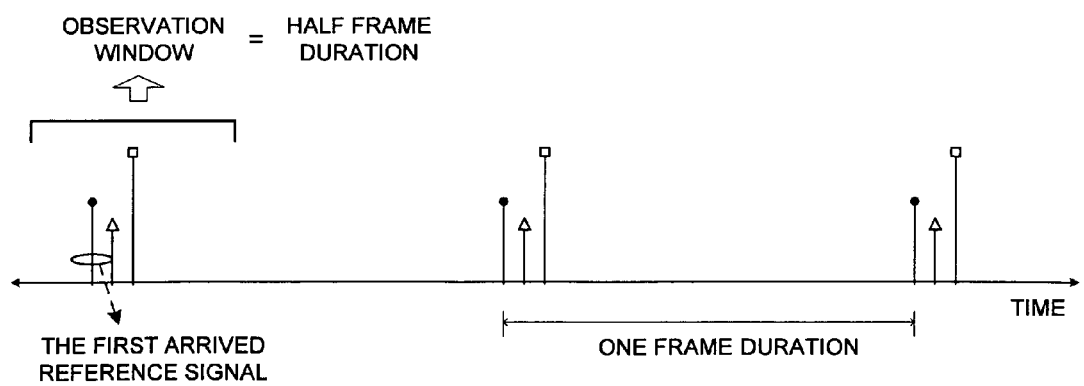
FIG. 13 illustrates a general method of detecting the arrival time of the desired reference signal from multiple received reference signals.

FIG. 13 illustrates a general method of detecting the arrival time of the desired reference signal from multiple received reference signals. Reference signals are usually transmitted by neighboring macro BSs periodically (e.g., every 5 ms for each frame), and the first received reference signal can thus be identified by using a predefined observation window. For example, the observation window can be of the length of smaller than one half of the reference signal periodicity length (e.g., a half of frame duration). As illustrated in FIG. 13, because propagation delay and multipath effect are typically much smaller than a half of frame duration, the femto BS is able to capture the arrival times of all the reference signals transmitted by different BSs within one observation window. Thus, the femto BS is able to identify and detect the first arrived reference signal as the desired reference signal within one observation window.

Figure 14:
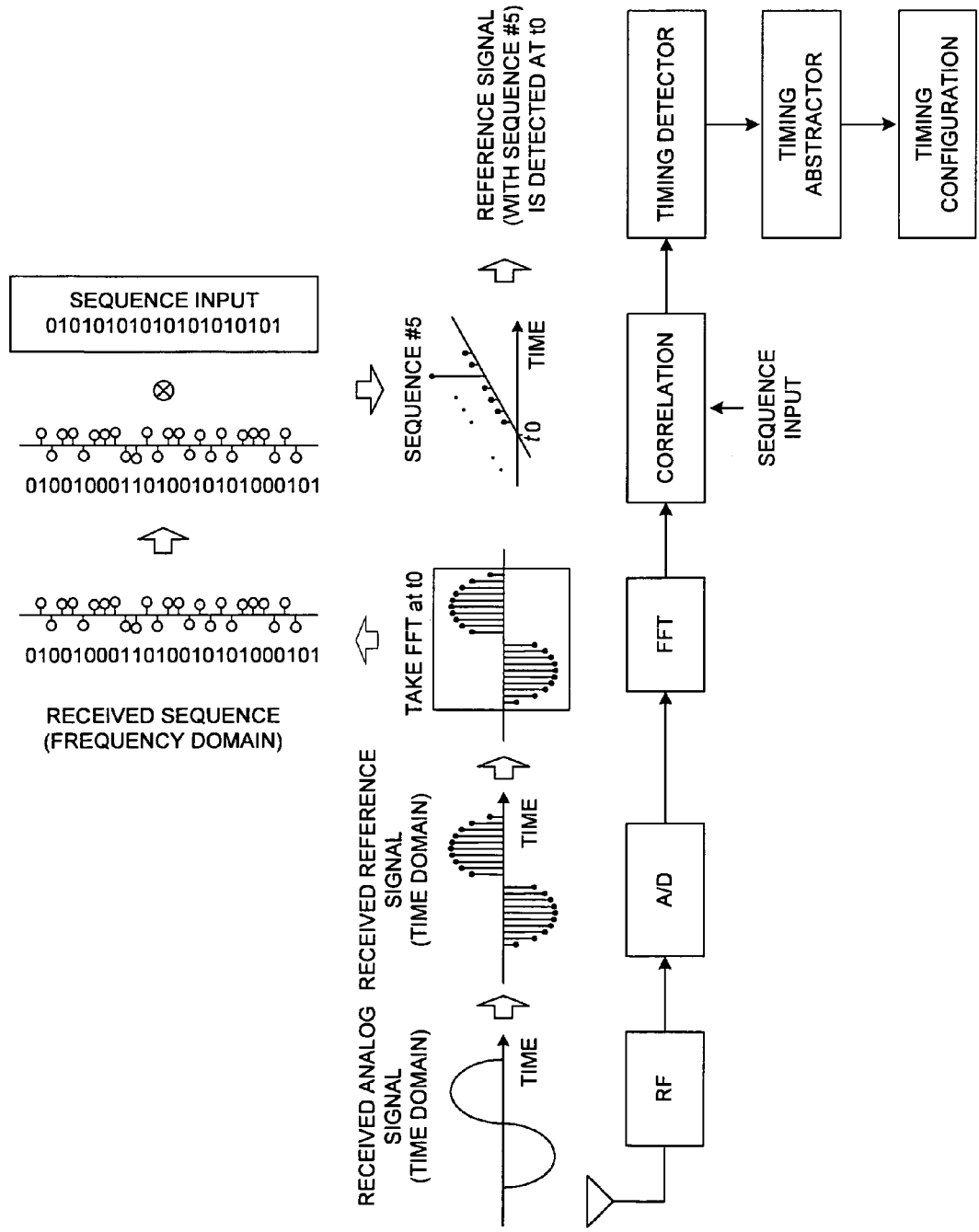
FIG. 14 illustrates a first embodiment of detecting the arrival time of a reference signal.

FIG. 14 illustrates a first embodiment of detecting the arrival time of a reference signal by a femto BS. The femto BS comprises an RF module, an A/D converter, a FFT module, a correlation module coupled to an antenna, a timing detector, a timing abstractor, and a timing configuration module. In the example of FIG. 14, only one reference signal is transmitted by a macro base station without multipath effect. The RF module first receives the analog reference signal via the antenna in time domain. The analog reference signal is then digitized by the A/D converter to a digital signal, which is transferred by the FFT module into a received sequence at time instance t0 in frequency domain. The received sequence is then correlated with different sequence input by the correlation module. Finally, the timing detector detects the reference signal with a correlated sequence code at time instance t0. The timing abstractor then selects t0 as the arrival time of the reference signal.

Figure 15:
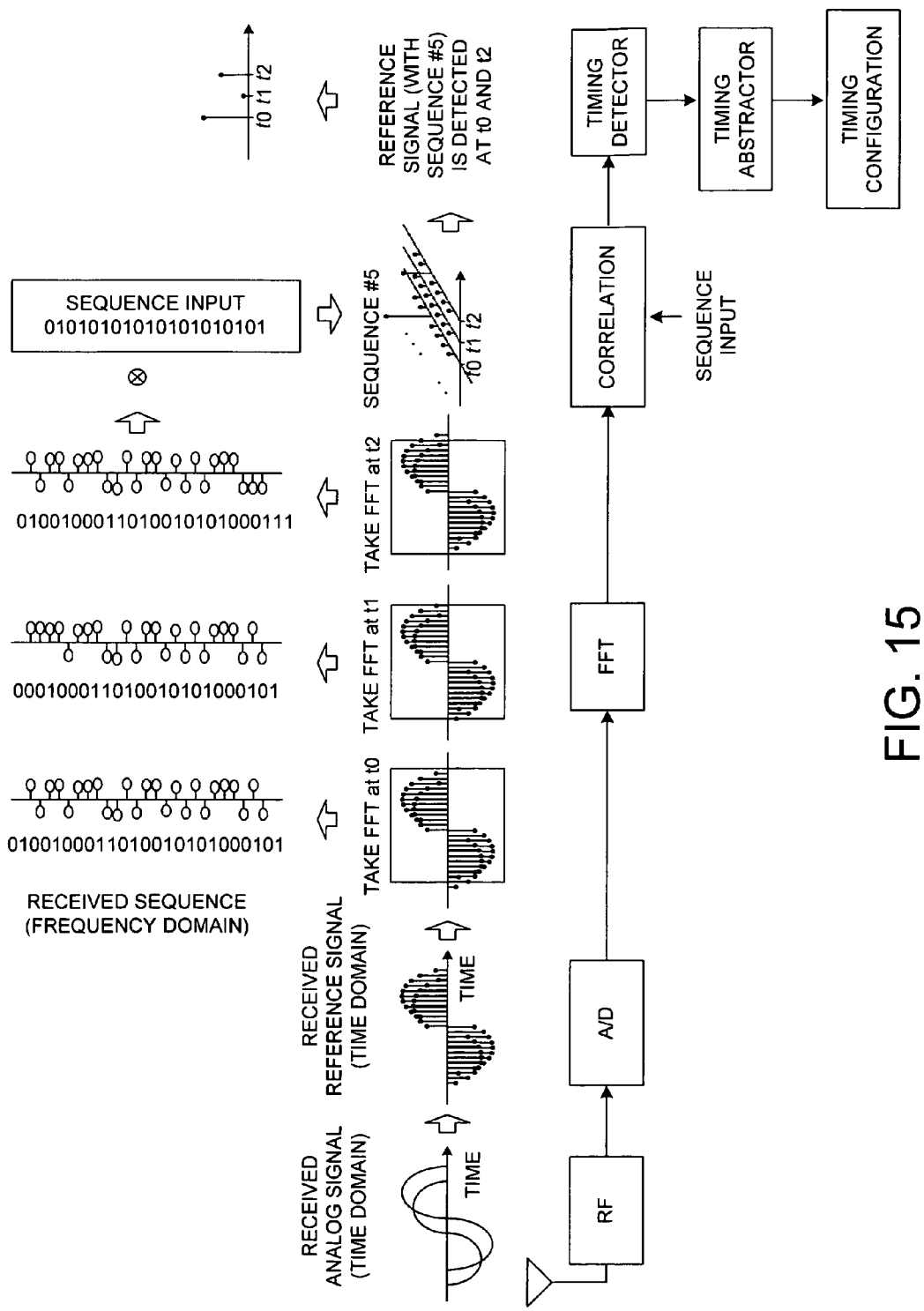
FIG. 15 illustrates a second embodiment of detecting the arrival time of a reference signal with multipath effect.

FIG. 15 illustrates a second embodiment of detecting the arrival time of a reference signal with multipath effect. In the example of FIG. 15, only one reference signal is transmitted by a macro base station with multipath effect. Thus, the femto BS may detect the same reference signal received at different time instance by the timing detector. Based on the inputs from the timing detector, the timing abstractor then determines the best timing reference by selecting the first one. The timing configuration module then uses the timing reference to configure downlink transmission time for the femto BS to achieve network synchronization.

Figure 16:
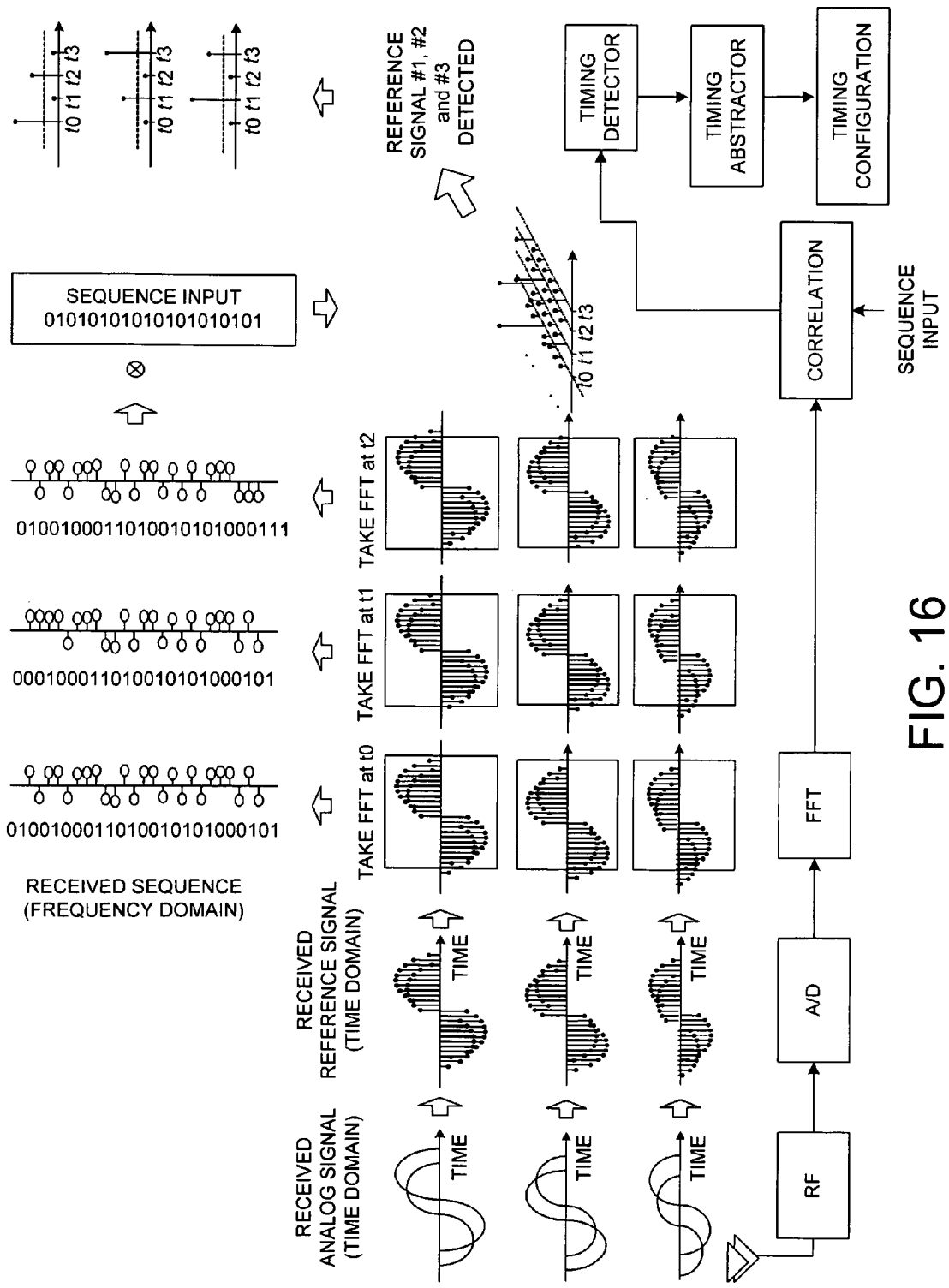
FIG. 16 illustrates a third embodiment of detecting the arrival time of multiple reference signals with multipath effect.

FIG. 16 illustrates a third embodiment of detecting the arrival time of multiple reference signals with multipath effect. In the example of FIG. 16, multiple reference signals are transmitted by multiple macro base stations and each of the reference signal experiences multipath fading channel. Thus, the femto BS may detect the different reference signals received at different time instance by the timing detector. Based on the inputs from the timing detector, the timing abstractor then determines the best timing reference by selecting the first one, regardless of which BS transmits the selected reference signal. The timing configuration module then uses the timing reference to configure downlink transmission time for the femto BS to achieve network synchronization.

Figure 17:
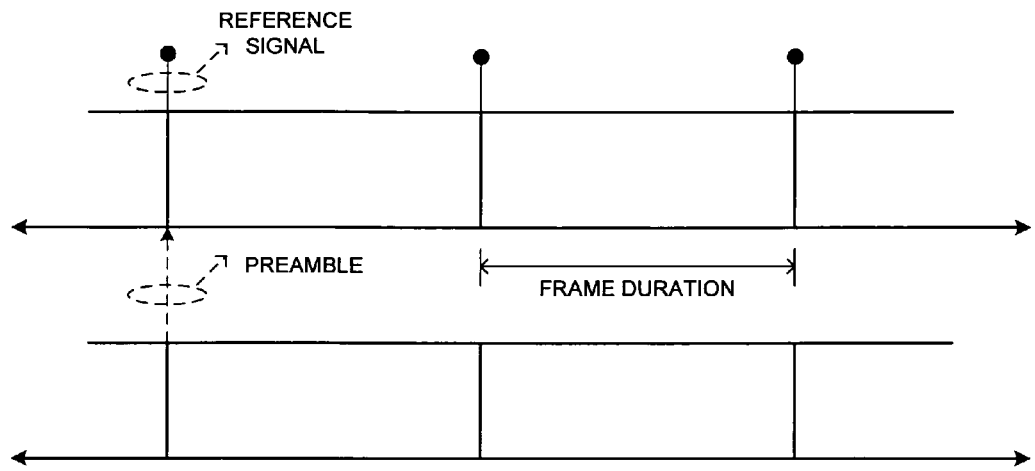
FIG. 17 illustrates a first embodiment of configuring downlink transmission time by a femto base station.

FIG. 17 illustrates a first embodiment of configuring downlink transmission time by a femto BS. In the example of FIG. 17, the reference signal (e.g., preamble or synchronization signal) is transmitted at the starting boundary of the downlink frame by a neighboring BS. The femto BS simply sets its downlink starting frame boundary to be the same as the timing when the reference signal is first received by the femto BS.

Figure 18:
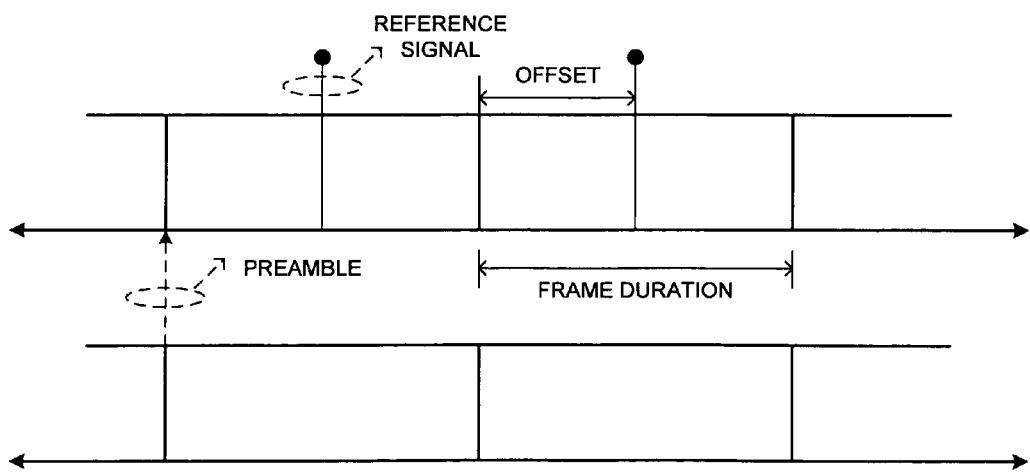
FIG. 18 illustrates a second embodiment of configuring downlink transmission time by a femto base station.

FIG. 18 illustrates a second embodiment of configuring downlink transmission time by a femto BS. In the example of FIG. 18, the reference signal (e.g., mid-amble or post-amble) is not transmitted at the starting boundary of the downlink frame by a neighboring BS. In such a case, the femto BS first estimates the offset between the reference signal and preamble. The femto BS then sets its downlink starting frame boundary to be the same as the timing when the reference signal is first received by the femto BS plus the same offset.

Although the present invention has been described in connection with certain specific embodiments for instructional purposes, the present invention is not limited thereto. For example, there are different ways to detect the timing of a received reference signal, using a correlation module to match the received sequence in frequency domain is just one example. Accordingly, various modifications, adaptations, and combinations of various features of the described embodiments can be practiced without departing from the scope of the invention as set forth in the claims.

What is claimed is:

1. A method for downlink transmission synchronization in a cellular orthogonal frequency division multiplexing (OFDM) system, the method comprising:
   (a) scanning and receiving a plurality of reference signals transmitted from a plurality of neighboring macro base stations by a femto base station;
   (b) determining a desired reference signal by selecting from the received plurality of reference signals during a predefined observation window, wherein the observation window length is smaller than half of a frame length but substantially larger than propagation delay among the plurality of neighboring macro base stations; and
   (c) configuring downlink radio signal transmission of the femto base station based on the desired reference signal such that the femto base station is synchronized with the plurality of neighboring macro base stations.

2. The method of claim 1, wherein downlink radio signals transmitted by the plurality of neighboring macro base stations are synchronized before the scanning the plurality of reference signals by the femto base station.

3. The method of claim 1, wherein two base stations are synchronized when arrival time difference for radio signals transmitted from the two base stations is smaller than a guard interval of an OFDM symbol.

4. The method of claim 1, wherein the desired reference signal is a selected reference signal first received by the femto base station during the observation window.

5. The method of claim 1, wherein the desired reference signal is a downlink preamble transmitted at a starting boundary of a downlink frame, wherein the preamble is received by the femto base station at a certain timing, and wherein the femto base station transmits a downlink frame at the same certain timing.

6. The method of claim 1, wherein the desired reference signal is transmitted during a downlink frame with an offset, wherein the desired reference signal is received by the femto base station at a certain timing, and wherein the femto base station transmits a downlink frame at the same certain timing with the same offset.

7. The method of claim 1, wherein the plurality of reference signals comprise a reference signal transmitted by a base station with multipath effect.

8. The method of claim 1, wherein the femto base station is an access-point base station used for indoor coverage in the cellular OFDM system, and wherein the femto base station is connected to a backhaul server through a normal broadband physical link.

9. The method of claim 1, wherein the femto base station and each of the plurality of neighboring macro base stations have overlapping cell coverage.

10. A femto base station in a cellular orthogonal frequency division multiplexing (OFDM) system, the femto base station comprising:
a radio frequency (RF) module that receives a plurality of reference signals transmitted by a plurality of neighboring macro base stations;
a timing detector that detects a corresponding arrival time of each of the reference signals;
a timing abstractor that determines a desired timing reference based on the detected arrival time of a desired reference signal determined by selecting from the plurality of reference signals during a predefined observation window, wherein the observation window length is smaller than an OFDM frame length but substantially larger than propagation delay among the plurality of neighboring macro base stations; and
a timing configuration module that configures downlink transmission timing of the femto base station based on the desired timing reference such that the femto base station is synchronized with the plurality of neighboring macro base stations.

11. The femto base station of claim 10, wherein two base stations are synchronized when arrival time difference for radio signals transmitted from the two base stations is smaller than a guard interval of an OFDM symbol.

12. The femto base station of claim 10, wherein the desired reference signal is a reference signal first received by the femto base station during the observation window.

13. The femto base station of claim 10, wherein the desired reference signal is a downlink preamble transmitted at a starting boundary of a downlink frame, wherein the preamble is received by the femto base station at the reference timing, and wherein the femto base station transmits a downlink frame at the same reference timing.

14. The femto base station of claim 10, wherein the desired reference signal is transmitted during a downlink frame with an offset, wherein the desired reference signal is received by the femto base station at the reference timing, and wherein the femto base station transmits a downlink frame at the same reference timing with the same offset.

15. The femto base station of claim 10, wherein the plurality of reference signals comprise a reference signal transmitted by a base station with multipath effect.

16. The femto base station of claim 10, further comprising:
a correlation module that correlates one or more received sequences in frequency domain such that the timing detector detects the corresponding arrival times of the plurality of received reference signals in time domain.

17. The femto base station of claim 10, wherein the femto base station is an access-point base station used for indoor coverage in the cellular OFDM system, and wherein the femto base station is connected to a backhaul server through a normal broadband physical link.

18. A femto base station in a cellular orthogonal frequency division multiplexing (OFDM) system, the femto base station comprising:
a radio frequency module that receives a plurality of reference signals transmitted by a plurality of neighboring macro base stations; and
means for detecting a corresponding arrival time of each of the plurality of reference signals and thereby determining a desired timing reference of a desired reference signal by selecting from the plurality of reference signals during a predefined observation window, wherein the observation window length is smaller than half of a frame length but substantially larger than propagation delay among the plurality of neighboring macro base stations, and wherein the femto base station configures downlink transmission timing based on the desired timing reference such that the femto base station is synchronized with the plurality of neighboring macro base stations.

19. The femto base station of claim 18, wherein two base stations are synchronized when arrival time difference for radio signals transmitted from the two base stations is smaller than a predefined value, and wherein the predefine value is smaller than a guard interval of an OFDM symbol.

20. The femto base station of claim 18, wherein the desired reference signal is a reference signal first received by the femto base station during the observation window.

21. The femto base station of claim 18, wherein the means comprises a timing detector and a timing abstractor that detects and determines the desired timing reference.

* * * * *